United States Patent [19]
Preisler et al.

[11] Patent Number: 5,675,803
[45] Date of Patent: Oct. 7, 1997

[54] METHOD AND APPARATUS FOR A FAST DEBUGGER FIX AND CONTINUE OPERATION

[75] Inventors: Thomas Preisler, Morgan Hill; Wayne C. Gramlich, Sunnyvale; Eduardo Pelegri-Llopart, Mountain View; Terrence C. Miller, Menlo Park, all of Calif.

[73] Assignee: Sun Microsystems, Inc., Mountainview, Calif.

[21] Appl. No.: 299,720

[22] Filed: Sep. 1, 1994

Related U.S. Application Data

[63] Continuation-in-part of Ser. No. 189,089, Jan. 28, 1994, Pat. No. 5,581,697.

[51] Int. Cl.$^6$ .................................................. G06F 9/44
[52] U.S. Cl. ................................................ 395/704; 395/705
[58] Field of Search .................................... 395/650, 700

[56] References Cited

U.S. PATENT DOCUMENTS

| 5,193,180 | 3/1993 | Hastings | 395/575 |
| 5,325,532 | 6/1994 | Crosswy et al. | 395/700 |
| 5,335,344 | 8/1994 | Hastings | 395/575 |
| 5,446,898 | 8/1995 | Bealkowski et al. | 395/700 |
| 5,459,868 | 10/1995 | Fong | 395/700 |
| 5,481,713 | 1/1996 | Wetmore et al. | 395/700 |
| 5,495,611 | 2/1996 | Bealkowski et al. | 395/700 |

OTHER PUBLICATIONS

Patent Abstract of Japan, No. JP62186938, Fujitsu, Ltd., Nose Mihoko, Dec. 17, 1986.
Article entitled "An incremental C Compiler", Computer Sep. 22, 1989, vol. 22, No. 9, pp. 89–90.
Article entitled "An Integrated C Programming Environment", by Robert J. Evans, Computer Society International Conference, Spring Meeting, Feb. 26–Mar. 2, 1990, No. Conf. 35, pp. 356–359.

*Primary Examiner*—Kevin A. Kriess
*Assistant Examiner*—John Q. Chavis
*Attorney, Agent, or Firm*—Erwin J. Basinski

[57] ABSTRACT

This Continuation-In-Part describes a part of this run-time debugger operation which is designated the "Fix-and-Continue" invention. This invention permits a user to begin a debugging session wherein if an error in the code is encountered, the user can edit the corresponding source code to correct the error and then execute a "Fix and Continue" command all without leaving the debugging session. The Fix and Continue code calls the compiler to recompile the source code file with the edited text in it, receives the resulting recompiled object code file from the compiler, uses the dynamic linker to link the recompiled object code into the target application program process, patches the previous version of this same object code fie to refer to the newly recompiled code, resets any required variables and registers, resets the program counter to the line of code being executed when the error was discovered. The debugger then continues in the debug session thereby saving the time it would ordinarily take to quit the debug session, relink and reload the target program and start the debug session once again.

20 Claims, 10 Drawing Sheets

Destructor Tree

Consider the following C++ function where A is a C++ class. The destructor state associated with teh beginning of each source line is also listed:

800

| 802 Line | Destructor State 804 |
|---|---|
| 7: foo() | 0 |
| 8: { | 0 |
| 9:   A a; | 0 |
| 806 → 10:   if (...) { | 2 → 812 |
| 11:     A b; | 2 |
| 12:     if (...) { | 3 |
| 13:       A c; | 3 |
| 808 → 14:       ...; | 4 → 814 |
| 15:     } | 4 |
| 16:     ...; | 3 |
| 17:   } | 3 |
| 18:   A d; | 2 |
| 810 → 19:   ...; | 5 |
| 20: } | |

METHOD AND APPARATUS FOR A FAST DEBUGGER FIX AND CONTINUE OPERATION

RELATED INVENTIONS

This application is a Continuation-In-Part of U.S. patent application Ser. No. 08/189,089 filed on Jan. 28, 1994 now U.S. Pat. No. 5,581,697, titled "Method and Apparatus for Run-Time Error Checking Using Dynamic Patching" by Wayne C. Gramlich, Sunnyvale, Calif.; Achut Reddy, San Jose, Calif.; and Shyam Desirazu, Foster City, Calif. The parent application discloses and claims Run Time Checking in a debugger and this continuation-in-part discloses and claims a Fix-and-Continue facility in the debugger.

BACKGROUND OF THE INVENTION

1. Field of the Invention

This invention relates to the field of program error checking and correction. More specifically, the parent application discloses and claims Run Time Checking in a debugger and this continuation-in-part discloses and claims an invention in a debugger which relates to a method and apparatus for error detection and correction using an enhanced compiler and dynamic linker as adjuncts to a debugger fix-and-continue system.

2. Background

With the increase in size and sophistication of programs, the need for more flexible and sophisticated testing and debugging tools has also increased. Memory access related errors are one of the most important errors which must be monitored and rectified in the execution and development of programs. Another major problem with current debuggers is the time it takes to completely debug a program, especially as programs get larger and more complex. The current practice for testing and debugging programs is either to have the compiler output extra instructions for debugging purposes or to post-process the object files.

In the approach using the compiler to output extra instructions for debugging purposes, each type of patch desired is represented by a corresponding compiler flag whereby appropriate code is then inserted by the compiler. This approach of having the compiler output extra instructions for debugging purposes has major disadvantages including the need to recompile the program to insert the extra instructions.

The post-processing object files approach takes object files as input and writes out patched versions of these object files. After all of the object files for the executable program are modified, such patched versions of the object files are then linked together to form an executable program. The patching and linking is done before the program run-time.

There are additional drawbacks to the implementation and use of the prior art approaches. One disadvantage is the need for extra links to relink the files into the executable program once these files are patched. Another disadvantage is the inability to turn the patching on and off dynamically. In prior art approaches, if additional patching of a program is desired during program run-time, the entire process of patching, relinking and in the case of the compiler approach, the recompiling of the program is necessary. In other words, any additional patching requires one to star the whole process over. Yet another disadvantage to the prior art approaches is the inability to handle shared libraries. Not only do the libraries initially loaded with the program have to be patched, but additionally all the libraries that the program may or may not use subsequent to the initial loading of the program must all be patched. Finally, the disadvantages of the prior art approaches also include the need for separate versions of objects and libraries and the fact that the patch scope of the two prior art approaches do not cover a function or a line, but instead can only handle a file.

Additionally, both of the aforementioned prior art approaches utilize a static patching approach to patch the programs to be error checked. In this static patching approach, a program is prepatched before execution, and such patching is done to the entire program and done only once for such program. All the libraries the program is using immediately as well as all the libraries the program may never use must also be known for pre-patching purposes. In addition, the patched objects must be relinked together, hence creating a need for extra links.

As will be described, the present invention provides a more flexible approach to debugging programs which overcomes the many disadvantages and limitations of the prior art.

It is desirable that once a debug session is started errors which are detected in a target program can be quickly corrected and the debug session resumed until the entire target program is debugged.

For example, in the past when an error was detected, the debug session would be ended, the errors corrected in the source code, the source code recompiled, and the recompiled object code relinked into the remaining modules of the target program, the whole reloaded and the debug session resumed. This process for a large program could take a very long time (sometimes hours) to relink and reload the program. This process was repeated for each error detected until the target program was deemed "bug-free." Accordingly, the process of debugging a large program could take a very long time to complete.

In the past, attempts have been made to edit only the file with the error corrections, reload that file only and restart the debug session where it left off. The problem with this in the past was that there was an attempt to bypass the re-compile operation, requiring the debugger to interpret the edit corrections. This procedure has proven to be unsatisfactory because it is extremely slow, required the debugger to be maintained simultaneously with maintenance to the associated compiler and required the debugger to be almost as complex as a compiler itself in order to interpret the edit corrections.

SUMMARY OF THE INVENTION

This Continuation-In-Part describes a part of this run-time debugger operation which is designated the "Fix-and-Continue" invention. This invention permits a user to begin a debugging session wherein if an error in the code is encountered, the user can edit the corresponding source code to correct the error and then execute a "Fix and Continue" command all without leaving the debugging session. The Fix and Continue code calls the compiler to recompile the source code file with the edited text in it, receives the resulting recompiled object code file from the compiler, uses the dynamic linker to link the recompiled object code into the target application program process, patches the previous version of this same object code file to refer to the newly recompiled code, resets any required variables and registers, resets the program counter to the line of code being executed when the error was discovered. The debugger then continues in the debug session thereby saving the time it would ordinarily take to quit the debug session, relink and reload the target program and start the debug session once again.

The "Fix and Continue" invention uses an enhanced compiler to provide information on how to recompile a file and data to permit constructors and deconstructors to be processed so as to correctly set related variables, provides data to permit the correct resetting of registers and globalizes static variables to facilitate correct program restart without requiring relinking and reloading the program or restarting the entire debug session. The "Fix and Continue" invention has flexibility in setting various flags at the user's option to tell the compiler to add debugging information to the code or otherwise modify the line of code being recompiled.

DESCRIPTION OF THE DRAWINGS

The objects, features and advantages of the system of the present invention will be apparent from the following description in which.

NOTATIONS AND NOMENCLATURE

Figure 1:
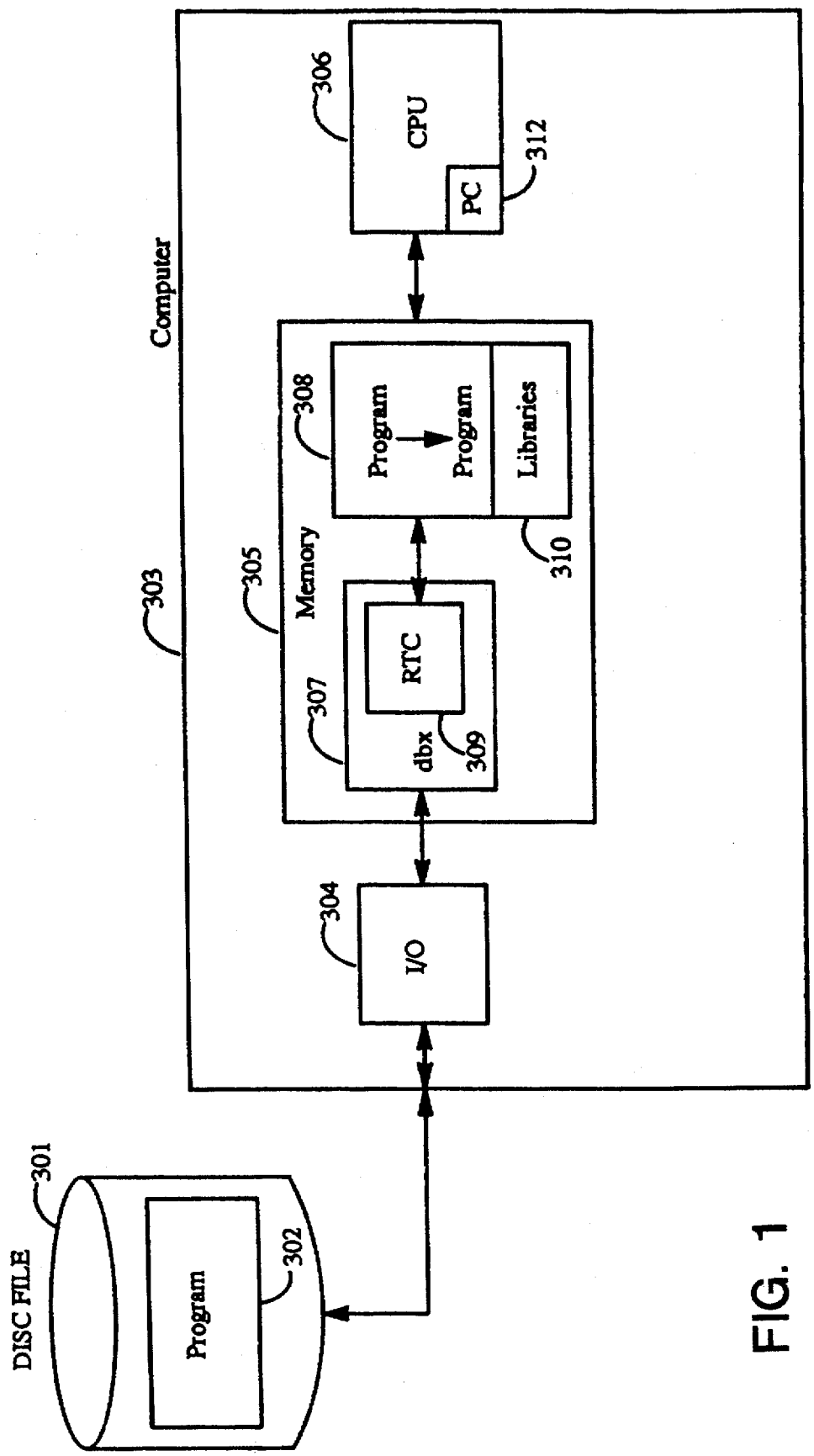
FIG. 1 is a computer block diagram of the run-time error checking system using dynamic patching.

The detailed descriptions which follow are presented largely in terms of processes and symbolic representations of operations on data bits within a computer memory. These process descriptions and representations are the means used by those skilled in the data processing arts to most effectively convey the substance of their work to others skilled in the art.

An process is here, and generally, conceived to be a serf-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be bourne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The processes presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Apparatus and methods for dynamic patching for run-time checking and for rapid target program correction and resumption of debugging are disclosed. In the following description, for purposes of explanation, specific instruction calls, modules, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

The present invention is a "Fix & Continue" system and method wherein a source code file containing edit corrections can be quickly recompiled without leaving the debugger, the resulting object code and related source information dynamically relinked to the existing object code, the object code patched into the prior version of the object code and the Program Counter reset to restart the debug session at the point of the previous error without having to relink and reload the entire target program. The Fix & Continue invention and this application is a Continuation-In-Part of U.S. patent application Ser. No. 08/189,089 filed on Jan. 28, 1994, titled "Method and Apparatus for Run-Time Error Checking Using Dynamic Patching" by Wayne C. Gramlich, Sunnyvale, Calif.; Achut Reddy, San Jose, Calif.; and Shyam Desirazu, Foster City, Calif. The parent application discloses and claims Run Time Checking related to a target application program being debugged while this continuation-in-part additionally discloses and claims the Fix and Continue error processing system for debugging the target application program. The parent application utilizes dynamic patching to check for program errors during program run-time which are not detected by the compiler. Such run-time errors are checked by patching the program such that at every point where the program is about to access memory, the program instead branches to a different location where checks on the memory address that is about to be accessed are performed. If the memory address that the program is about to access is invalid, an error is recorded, otherwise if the memory address is valid then the program will continue execution. The actual patching process is done inside a debugger.

FIG. 1 is a system block diagram for a computer system with run-time error checking using dynamic patching. It will be appreciated that the computer system illustrated in FIG. 1 is shown in conceptual form, and that many additional circuits, devices and interconnections of the computer system are not shown in order to not obscure the present invention.

As shown in FIG. 1, a target program image is read into a debugger program 307 (dbx) through an I/O device 304, and stored in memory to provide an in-memory copy 308 of a program 302. A module within the debugger program 307 referred to as a "run-time checking" (RTC) module 309 handles the user interface, printing of error messages and also handles the patching of the in-memory copy 308 of a program 302. A shared library (Libraries) module 310 is loaded into the program 302, and performs the run-time checking.

This in-memory copy of the program 302 changes to a patched program, called "instrumented program" herein. The patches are applied only to this in-memory copy 308 of the program 302 and not to the original program 302 stored on disk 301. Therefore, the original file 302 never changes and there is never any relinking of the file required for the executable program. In addition, the program 302 does not have to be pre-patched. Instead, the patches are applied when the checking is initiated. The choice by the user is therefore delayed until the actual run-time rather than before execution. The CPU 306 controls the program execution of the debugger 307 and the program under test 308. The CPU 306 contains a Program Counter ("PC") 312 which points to the next instruction to be executed.

The debugger program 307 can dynamically load libraries at run-time that were not specified at load time. Since such loading of libraries is done dynamically in the debugger program 307, the RTC module 309 can trap all calls to load a new library in the program and may apply patches just before such libraries are loaded. As such, the new libraries are also patched.

In sum, with the present invention there is no necessity for pre-patching a program before execution. Instead, the patches may be applied when the checking is initiated, thereby delaying the choice of the user until the actual run-time. Furthermore, by not modifying the program source code at all and thus eliminating the need to relink the object files to produce the executable program, the approach of the present method avoids the use of extra links. Finally, the patches are applied to an in-memory copy of the existing program such that a fully instrumented program with checks built into such instrumented program is produced.

Figure 2:
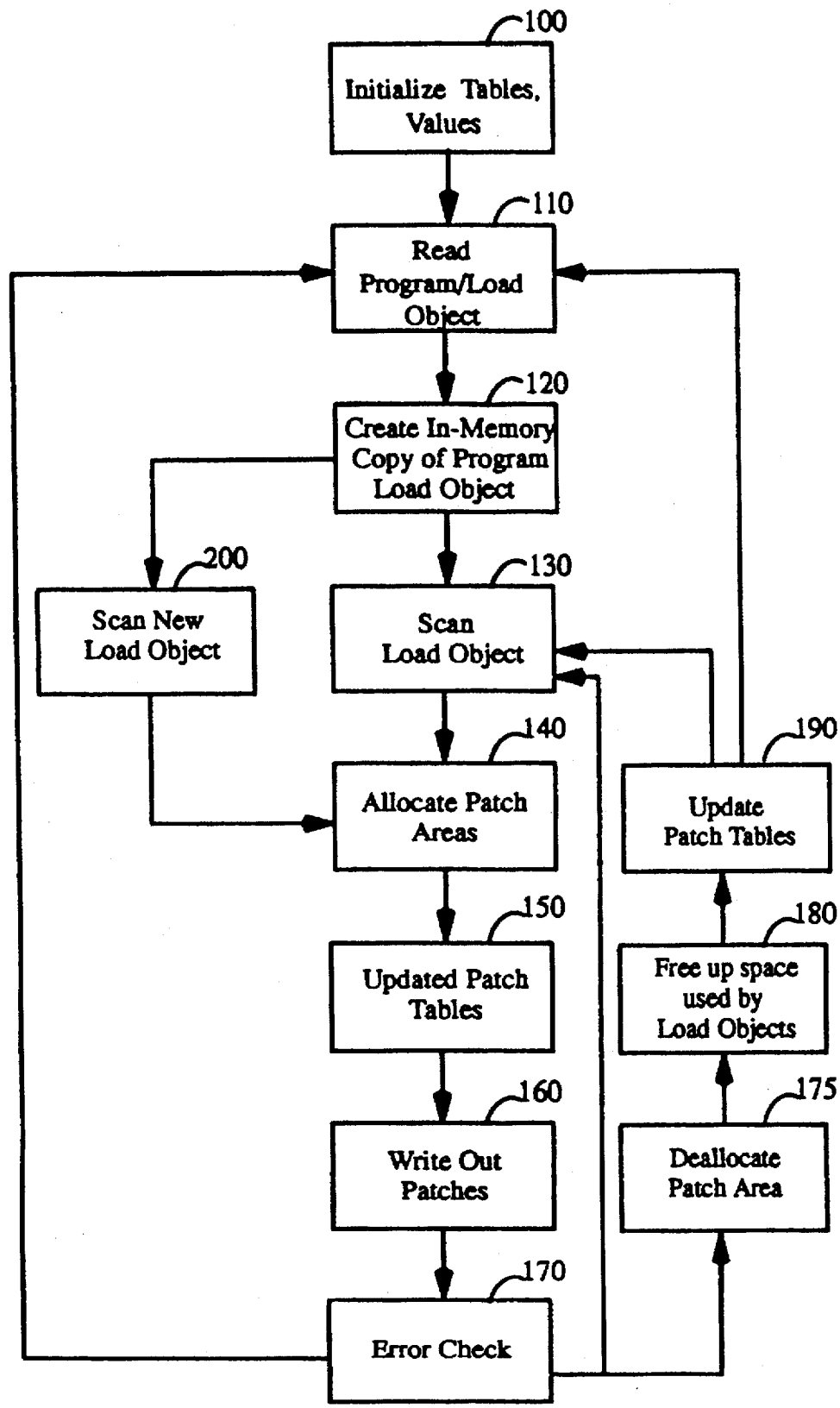
FIG. 2 is a general flow chart of the present invention's dynamic patching for the run-time error checking.

Reference is now made to FIG. 2, wherein a general flow chart for the method of dynamic patching for the run-time checking is illustrated. In order to detect memory access errors, all memory access instructions, including accesses to the stack and system calls that access user memory are intercepted. Such memory access instructions are then verified as to validity of memory address being accessed before continuing instruction execution.

For such error checking, the present invention disassembles the functions that are being checked. Next, the locations that need to be patched are identified as patch sites. Furthermore, the original instructions at these patch sites are then replaced by a branch to patch area instruction.

As illustrated in FIG. 2, block 100, space is allocated for the patch tables and the patch tables and values are initialized. Next, as illustrated in block 110, the program to be error checked is initially read and loaded as it exists on the disk file. Such program is normally loaded in portions (load objects) as they are accessed by the user. However, by going through the steps illustrated in FIG. 2, the debugger will cause essentially all of the program to be accessed. Thus, as a result, when the debugger program has completed its processes, all of the program will have been patched. This debugger program is a special process that is able to read and write other processes and therefore able to change the program image that is within the memory. All operations described within FIG. 2 are performed by the RTC module within the debugger program. As can be appreciated by FIG. 2, block 130, the debugger program creates a list of load objects. The load objects contain segments/functions within the program which have memory access instructions. The program consists of a number of these load objects. The first type of load object is the program's main routine, which is the user part of the program. There are also shared libraries that the program uses, which are another type of load object. Both types of load objects are required in order to run the program. Once the debugger program has received a list of the load objects, it will scan the load objects, searching for instructions that it is going to patch later on. The only pan of the load object the debugger program looks at during this instruction-by-instruction scan are the instructions themselves, i.e., the text, but not the data.

While the debugger program is identifying the patch sites, the debugger program also accumulates information regarding these patch sites, including patch site address, patch area address, patch type (i.e. memory access instruction type), whether a particular patch site should be patched, and the size of memory being accessed. Every load object has a table for the aforementioned patch site information, with one entry in the table for each patch site. The patch type or the type of memory access instruction for patching purposes defines the size of its corresponding section of path area where the error checking is processed. A check command or uncheck command issued by a user for a particular patch site will indicate whether or not that particular patch site is to be patched. More specifically, the check command indicates that the particular patch site should be error checked and the uncheck command conversely indicates that the particular patch site should not be error checked. At the very end of the scan, the debugger program comes up with a total size of the section of patch area that the debugger program is going to need in order to accommodate the patch sites found. The identification of a patch site only needs to be done once for a load object and any subsequent run only requires locating a space for the corresponding section of the patch area space and installing the patch. The total size needed for the patch area section is recorded and a list of the patch area section sizes is produced. This list of patch area section sizes is the input to the next step, step 140, in which memory space is actually allocated to the patch area. In step 140, the debugger program takes the list of patch area section sizes and attempts to allocate space for them. The debugger program first creates an initial map of the address space to see where everything is laid out. The system maps the load objects in various places in memory. Such mapping of load objects is not necessarily contiguous and there are holes in the address space. The job of the debugger program is to identify these holes and to map these lists of requests for space needed to these holes.

In one embodiment of the invention, the address space data is accessed to obtain a list of all segments in the address space along with each segment's starting address and size.

These segments may consist of text, data, stack and/or heap segments. The space between such segments, called "holes" herein, are used to allocate space for the sections of the path area. A list containing the starting address of each text segment, ending address of each text segment and the size of sections of the patch area, sorted by ascending order of the starting address of each text segment, is obtained from the previous step 130. In step 140, a list of holes with starting addresses and segment sizes of the holes sorted by starting address of each hole is generated. The aforementioned holes are compared to the sizes of sections of the patch area needed by first checking for holes with address locations higher than the patch sites for the corresponding sections of the patch area. Given a hole with a size larger than the size of the section of the patch area for which space is to be allocated and the hole is not immediately before a stack segment, then the section of the patch area is allocated the hole space. After going through the list of the patch area section sizes and the list of the holes and allocating the holes to the sections of the patch area, the list of unallocated patch area sections produced will be scanned in descending order. The holes at lower addresses than the patch sites which are greater than or equal to the corresponding sections of the patch area are searched. The holes which are greater than or equal to particular section of the patch area are allocated to that section of the patch area. Such section of the patch area is placed at the bottom of the hole. Any patch sites for which its corresponding section of patch area is not allocated at the end of this step is not patched and the user will be warned that the request for error check was not met. In step 150, the system takes the information of where it found all the sections of the patch area and stores that information in the patch table and updates the address information in these patch tables.

In step 160, spaces for sections of the patch area are allocated and all the instructions in the original program that need to be patched are identified. Now the patches actually get written out at this stage and at the completion of this stage the program is completely transformed to a fully instrumented program. The table of data containing the patch site information, as described previously (i.e., containing the patch site address, the patch area address, the patch type, whether the patch site is to be patched, and the size of memory being referenced), is used to determine the patch sites. If the pages containing the patch site and the corresponding section of the patch area have not been read, they are read and the patch type is written out into the corresponding section of the patch area. The original instruction in the patch site is replaced with a branch instruction to the corresponding section of the patch area, and such displaced original instruction is placed in the corresponding section of the patch area. This patching is done unless an uncheck command is issued for this particular patch site. If on the other hand an uncheck command is issued for this particular patch site, then that particular patch site will not be patched. There will be no inconsistent state while patching since the sections of the patch area are written before the patch sites are updated.

Any interrupts in a load object are blocked during the patching, and unblocked for servicing between patching of a load object, ensuring that a load object is either patched correctly or not patched at all. Issuing of a check command by the user during the time the program is active will not enable the patching of any load object active on the stack at that time. However, an uncheck command issued while the program is active will cause the patch to be de-installed in a load object. This step completes the initial patching implemented on a program as the program is about to run.

Essentially, all the steps illustrated in FIG. 2 from steps 100 to 160 are performed when the user wishes to run the program within the debugger program. In sum, steps 100 through 160 completes the patching for all the load objects that exist at the time the program is started.

In addition, the debugger program is able to load new load objects dynamically which were not in the program at the time the program was started. The system traps all calls to new load objects, and when the debugger program sees that a program is about to load a new object, the debugger program goes through a similar set of steps. The steps 110, 120, 200, 140, 150, 160 and 170 illustrate dynamic loading of a new load object. The steps are identical to the previously followed steps except there is no initialization. The global initialization is performed once only and then these steps are performed for each new load object that are dynamically loaded.

As illustrated in steps 175, 180 and 185 the debugger program is able to also de-install the patches and dynamically unload load objects. In step 175, the uncheck operation triggers the deinstallation of patches at either segments, modules, functions or for instructions. Given a patched function, the page containing the patch site to be de-installed as well as the page containing the corresponding section of the patch area are read. The original instruction is then obtained from the section of the patch area and the branch to patch area instruction in the patch site is replaced by this original instruction. In addition to this replacement of the patch instruction in the patch site, user breakpoints at these patch sites will require replacing the patch instruction in the breakpoint data structure associated with the patch site as well. In the event that the patch site was not patched, a warning is issued to the user and nothing is de-installed. The user issuing the check command will merely replace the instruction at the patch site with the branch to patch area instruction.

In step 180, at the programmer's option, space allocated for the load object may be deallocated. The dynamic deallocation is done in order to save address space. If a large number of new load objects are being loaded in, there may not be any empty address space. Given a module that is no longer needed, it may be more advantageous to deallocate such space for potential use. Finally, in step 190, the patch tables are updated with the information on the deallocated sections of the patch area.

Figure 3:
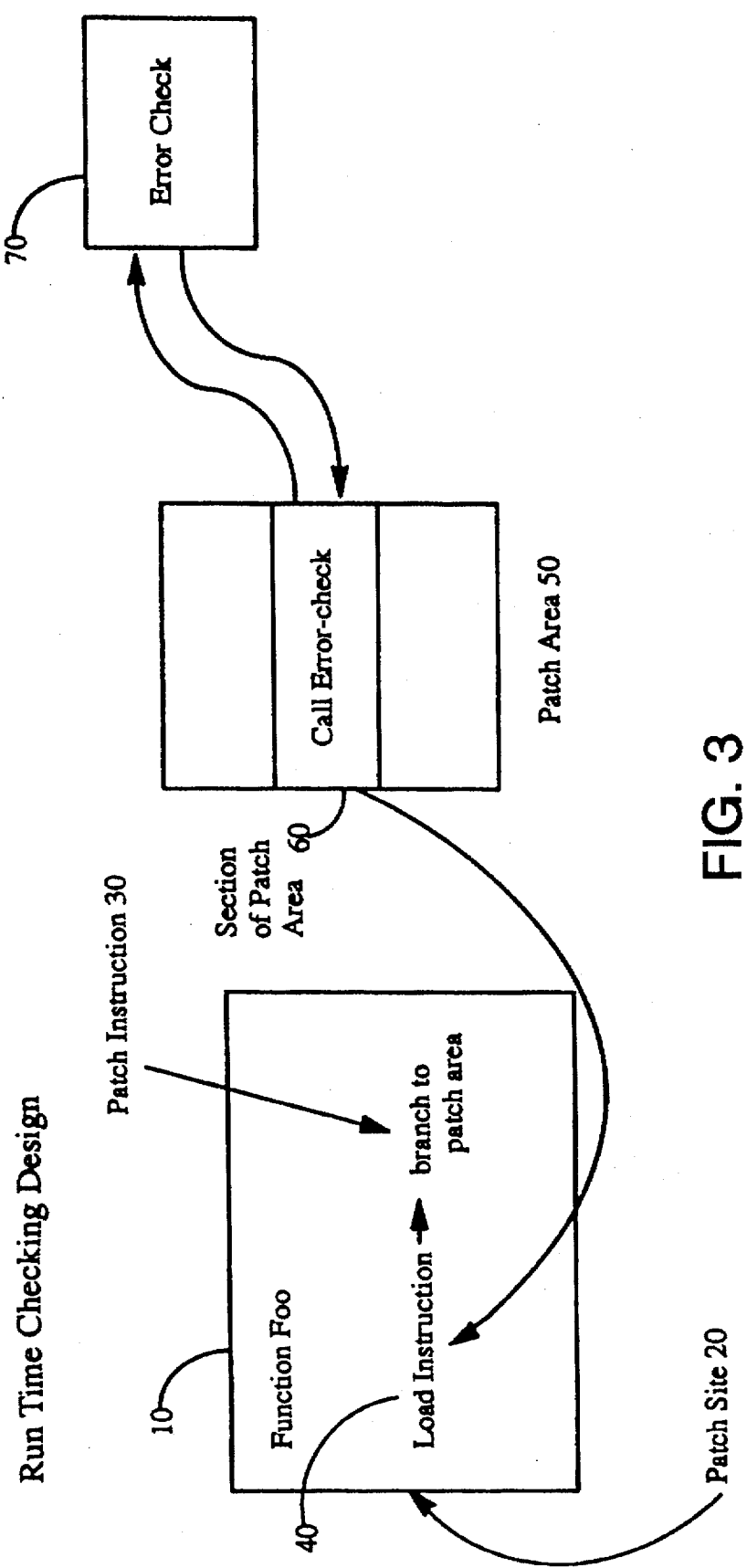
FIG. 3 illustrates the present invention's dynamic patching for the run-time error checking method.

FIG. 3 illustrates the dynamic patching for the runtime error checking method used in the present invention. A program consists of a number of load objects and in mm the load objects contain a number of functions, and, function 10 as function foo, is one example. Such function will have a number of memory access-related instructions. One such instruction is illustrated as load instruction 40. The run-time checking (RTC) module will patch each and every such instruction for every load object that it is patching. This run-time checking (RTC) module scans each and every individual instruction that needs to be patched, as was illustrated by Box 130 of FIG. 2, and the original instructions are then replaced by unconditional branch instructions to the patch area. The location of the instruction that is patched is called "the patch site" 20. Therefore, if there was a load instruction at a location within a load object then that location would be called "a patch site" 20. The memory location where the error checking is done is called "the patch area" 50. For each section of the patch area 60, there will be a unique patch site. Therefore if there are 1,000 patch sites, there will be 1,000 sections of the patch area.

For each instruction that is replaced within the load object, there is an instruction to branch to the corresponding section of the patch area 60. Thus, there is a custom section of the patch area 50 that is assigned to the whole load object for each patch site 20 and each patch site 20 is replaced with a branch to its own custom section in the patch area 50. These sections of the patch area 60 consist of several instructions which are basically set up to call some real checking codes 70 in a separate area in memory. Thus, a checking code is called from the patch area 50 which performs the checks. If there are any errors to report, the debugger program will report them, otherwise the process is returned to the patch area 50 and in turn the process is returned to the next instruction that will be executed in the user program. There are different types of sections of the patch area depending upon the types of instruction being patched. There are also several different kinds of cases due to delayed branch instructions that have to be handled separately. Therefore sections of the patch area are not identical. In sum, a section of the patch area is specifically for one particular patch. FIG. 3 illustrates a process in which patch sites are replaced by branches to a section of the patch area and a further branch to a checking code and back to the next instruction to be executed in the user program. There are other cases that may modify the illustration in FIG. 3. For example, if an instruction to be patched was in a delay slot of a branch, i.e., a delayed branch instruction, then after branching to the patch area and the checking code, the process should branch to the address location the process was supposed to branch to prior to the error checking instead of branching back to the next instruction in sequence.

Figure 7:
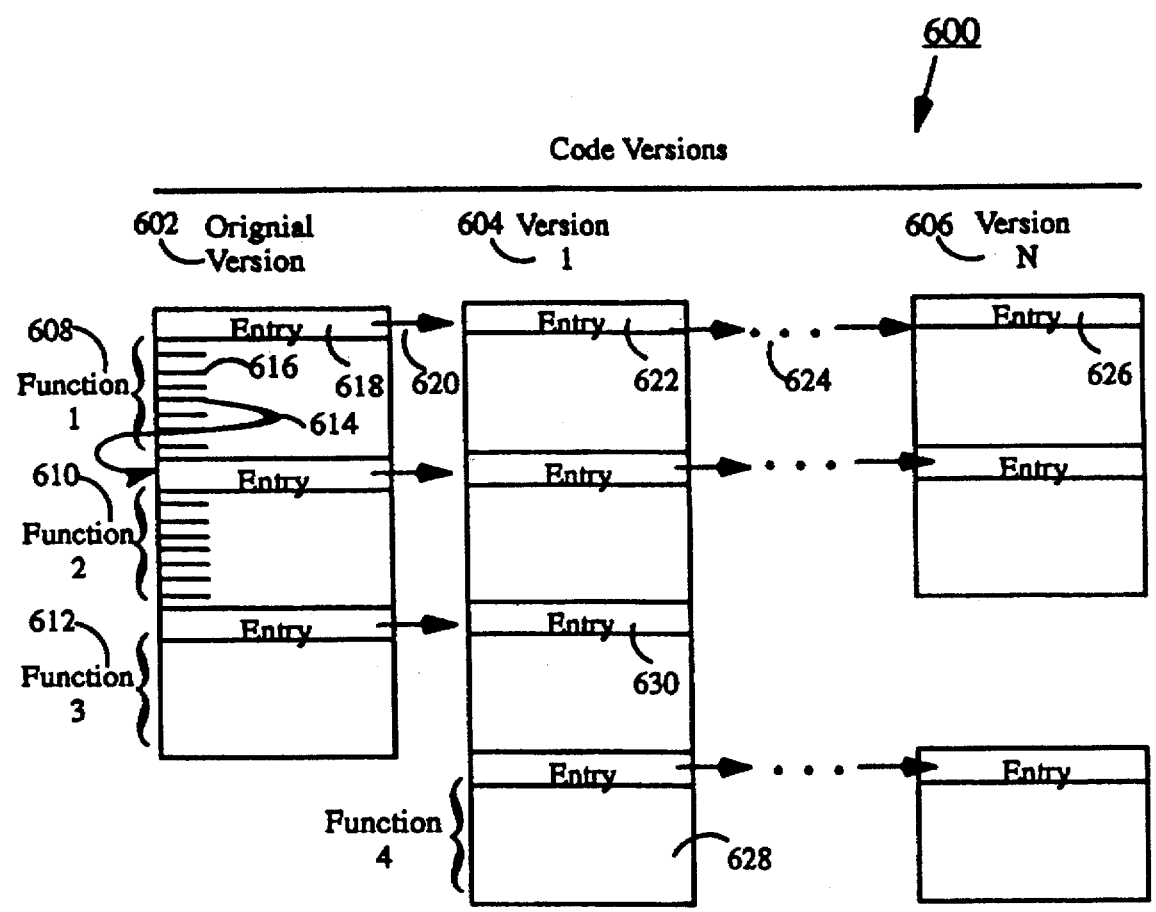
FIG. 7 illustrates the relationship of the original code version loaded at the beginning of the debug session and later recompiled versions which have occurred as a result of subsequent Fix and Continue operations.

The operational effect of this dynamic patching system is illustrated in FIG. 7, wherein successive versions of object code are patched to the original version of the object code. Referring to FIG. 7 an original version of object code 602 is shown containing a number of functions 608, 610, 612. As the debug session proceeds, new versions 604, 606 of a particular function are recompiled and patched into the original version 602. For example, when code version 1 604 is loaded into the debugger, the function 1 entry location 618 would be patched to go to the function 1 entry location of the revised code 622. Similarly, all function entry locations in the previous code version would be patched to point to the corresponding entry locations of the same functions in the revised code version. In the preferred embodiment, successive revisions of the same code sections (606 for example) may be connected to previous versions in memory at the same time up to the limits of memory available in the particular host computer system. Also in the preferred embodiment, the user may elect an option in the debugger which will patch the original version of code 602 directly to the latest version of code 606 while flushing intermediate copies of code from memory. In rare cases, this mode may be necessary if memory constraints exist or if the added overhead of traversing multiple pointers through multiple code versions would create a critical timing problem.

Further creative aspects of the debugger, which make use of these dynamic loading and patching features are now described and claimed.

FIX AND CONTINUE

Figure 4:
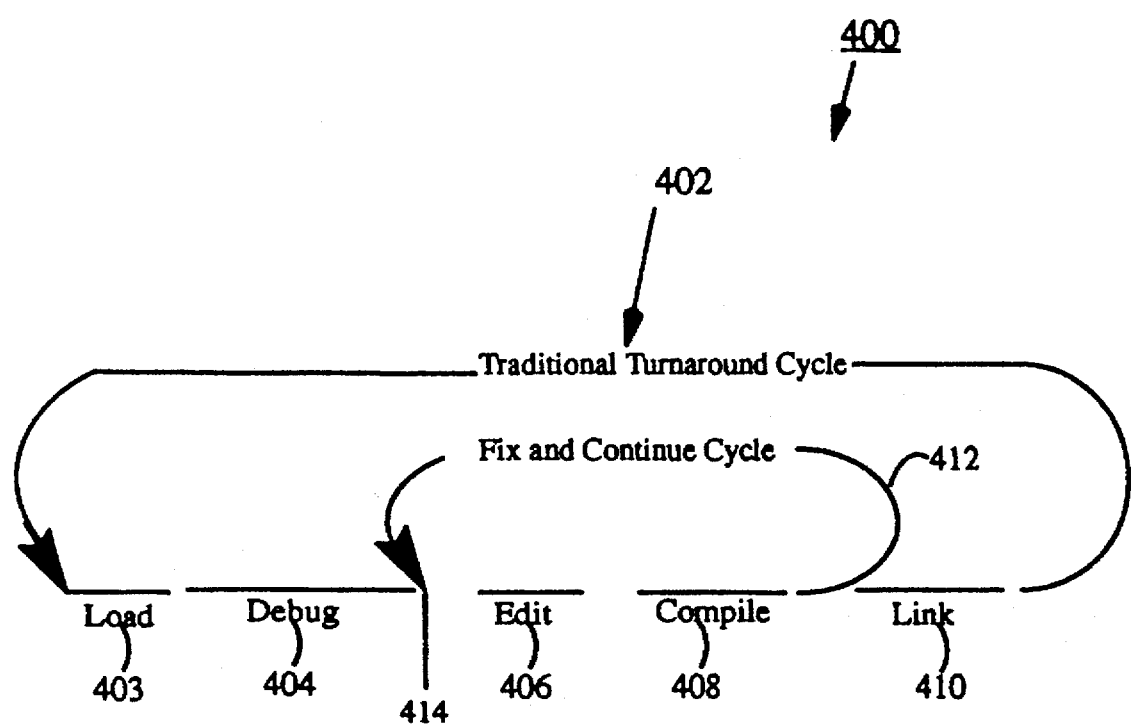
FIG. 4 illustrates both the traditional debug fix turnaround cycle and the Fix and Continue cycle of the present invention.
Figure 5:
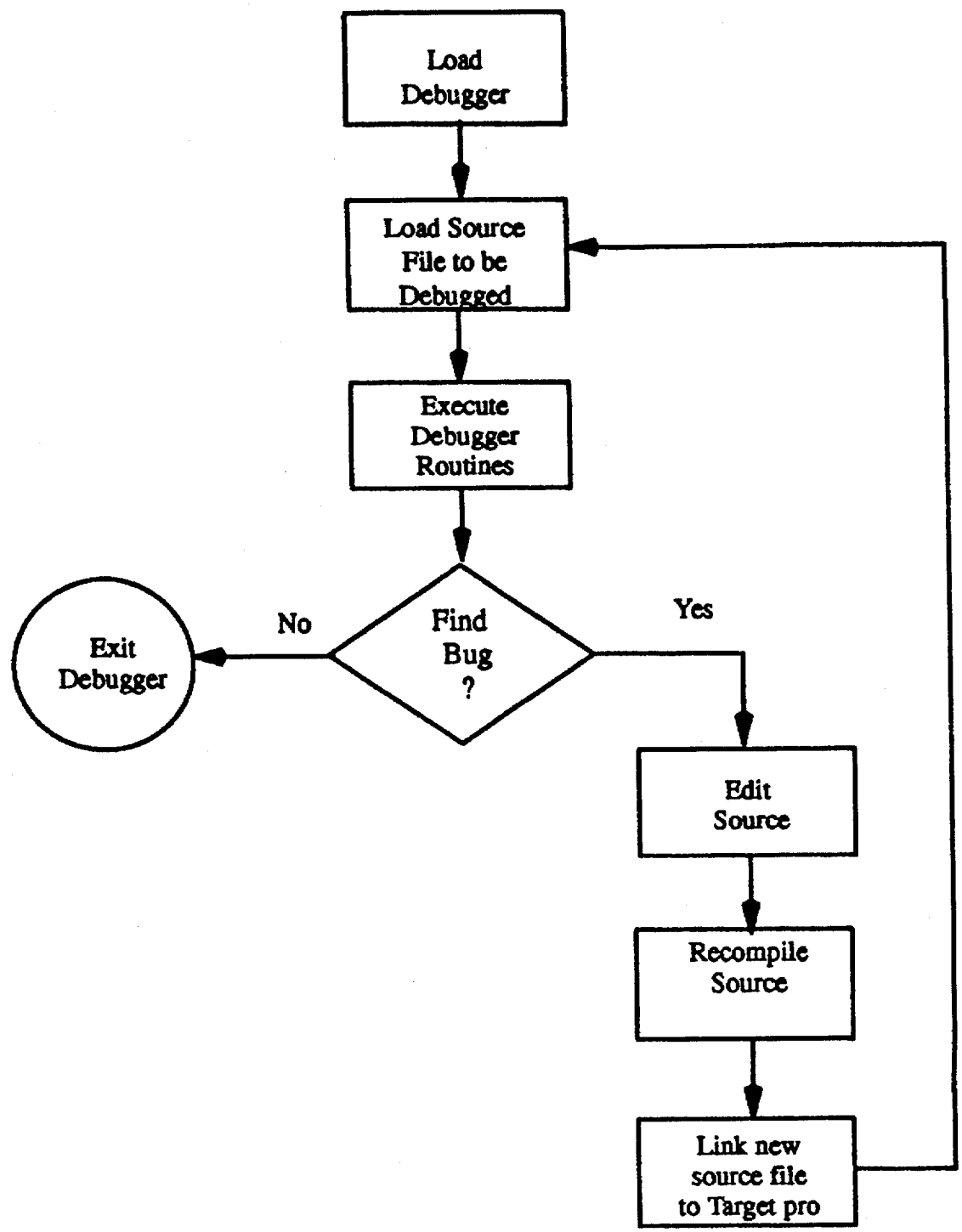
FIG. 5 illustrates the traditional debug fix turnaround cycle of the prior art in block diagram form.

The "Fix and Continue" invention described herein, in the preferred embodiment, is a part of the Debugger portion of the SPARCworks™ product version 3.0 and 3.0.1 which was described above. SPARCworks™ is a product of Sun Microsystems, Inc., the assignee of the present invention. Referring to FIG. 4, a traditional program debugging scenario 400 is depicted. In this case, the traditional turnaround cycle 402 is shown wherein the debugger program is loaded, the target program is loaded 403 and the debug session begins 404. In the traditional turnaround cycle 402 when an error was encountered the debugger would be halted, the source code edited 406 to correct the error, the edited source recompiled 408 outside the debugger (usually via the "make" command), the resulting recompiled object code file relinked 410 with the balance of the target program, the program reloaded again 403 and the debug session is restarted 404. When the next error was encountered, the traditional turnaround cycle 402 would be repeated until the debugging activity was completed. This traditional turnaround cycle 402 is also depicted as Prior Art in the flow chart of FIG. 5. The "Fix and Continue" invention (412 in FIG. 4) allows a user to modify a source file 406, and without leaving the Debugger, re, compile the source code file 408 and continue execution of the program in the debugging session at the point where the last error was found 414 while executing and debugging the target application program. The advantages of using this invention are that the user 1) does not have to relink 410 the program, 2) does not have to reload 403 the program into the debugger and 3) can resume running the debug session from the point where the last error was found 414.

How To Use the Invention

How to use the Fix and Continue invention is described in Chapter 20 of the SPARCworks manual titled "Debugging a Program" Part #801-5106-10, Revision A December 1993, pages 20–235 through 20–240 attached hereto as Appendix A and fully incorporated herein.

How To Make the Invention

Figure 6:
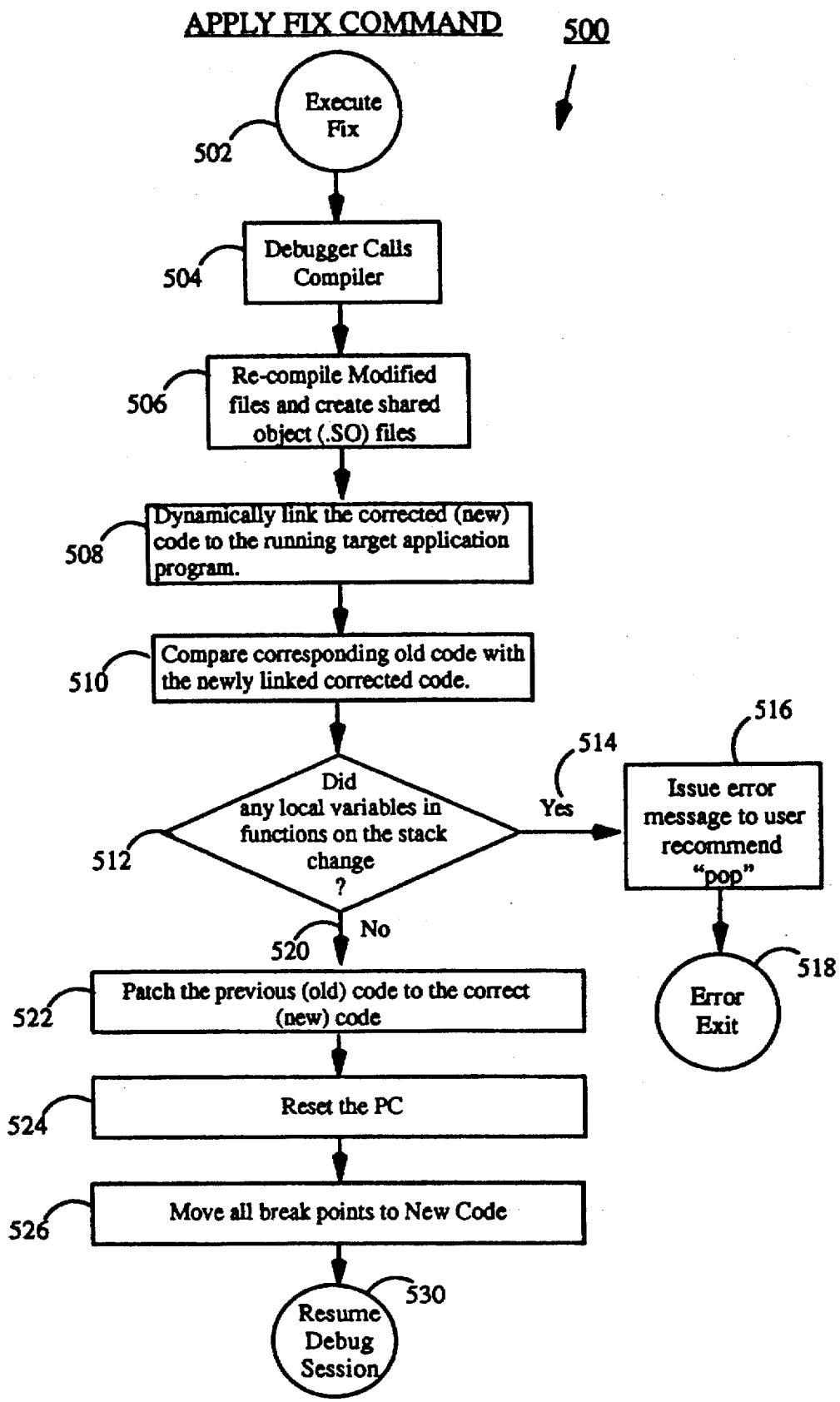
FIG. 6 illustrates in block diagram form the steps performed by the Fix command.

The following describes generally the operation and make up of a preferred embodiment of the present "Fix and Continue" invention. Those skilled in the art will recognize that the invention may be practiced using any programming language, any equivalent dynamic loader, any computer as the platform for operating the invention and using various sequences of operations to accomplish the basic fix and continue operation. Dynamic loaders and linkers are described in various Compiler and/or Operating System texts. Referring now to FIG. 6 the basic operation of the Fix command 500 is depicted. When an error is encountered in the debugging run, the source code must be edited to correct the error and after saving the changes to the source code, the FIX command of the present invention is executed 502. In response, the Debugger program calls the compiler 504 wherein the modified source code files are recompiled and shared object (.so) files created 506. The new object code file which was generated from the edited source file, is dynamically linked to the running target program 508 using the run-time linker. The old object code is compared to the newly linked code 510 to determine if any local variables in functions on the stack have been added, deleted or had their type changed 512. If a variable in a function on the stack did change 514 an error message is issued to the user 516 suggesting that he execute the "POP" command to remove that function from the stack and the Fix command then exits 518. In this event, the user would execute the "POP" command (which is described in more detail below) and then re-execute the Fix command. If no local variables were found to have changed 520 the old object code is then patched to the new code 522. (This patched code configuration is depicted in FIG. 7 and described more fully below). The Program Counter is then reset 524, all breakpoints that were set in the old object code file are moved to the new object code file 526 and debug session may resume 530 at the point where the error was previously detected.

An essential aspect of the present invention is the ability to properly reset the Program Counter (524 in FIG. 6) in order to continue the debug session properly after the recompiled file has been relinked to the target program process. The Program Counter specifies the address of the next instruction the CPU will execute. This address may be an actual memory address in some systems or a virtual address in systems which include virtual memory. The value in the Program Counter at the time the error was detected is saved so that the Fix and Continue operation can figure out where to restart the debug session after the error correction has been made. Accordingly when the Fix and Continue system returns control to the user to continue the debugging session, it must leave the Program Counter set at a place that is essentially the same as the place where the previous session stopped when the error was encountered. The Program Counter will be reset to an object code location corresponding to the beginning of the same line of source code in the edited version of the function as the line in the previous source code for the function where the error occurred, IF the function containing the line is on top of the stack being fixed. If however, the function containing the same line where the program stopped with the error is not on top of the stack being filed, a Pop command can be executed (this is described in detail below) which effectively sets the Program Counter to contain a location that corresponds to the beginning of the source code statement that made the call to the function that was popped off the stack ( that is, to the function that was being executed when the error was detected). As indicated in the discussion of the Fix command (see FIG. 6) above, the presently preferred embodiment does not automatically execute a POP command if a local variable in a function on the stack has changed. However, those skilled in the art would know that it would be an easy matter to do so.

There are two fundamental problems that need to be addressed for adjusting the Program Counter—1) Object-Oriented (C++ for example) constructors and destructors and 2) floating point register spills.

Constructors and destructors:

In the C++ system, most object classes have at least one "Constructor". This is a function that is implicitly called whenever an object of that class is created. It sets initial values in the object. There is also a corresponding clean-up function, called a "Destructor", which is invoked when an object is destroyed (goes out of scope or is returned to the heap). Destructors are less common than Constructors and they handle any special termination needs, garbage collection, and so on. Some people use destructors as a bulletproof way to insure that synchronization locks are always released on exit from appropriate scopes. So destructors not only clean up an object, but also the locks that the object held. Constructors and Destructors are described in any Object-oriented Software Construction Text. See for example, "Object-oriented Software Construction" by Bertrand Meyer, Prentice Hall 1988, ISBN 0-13-629049-3.

Consider the following piece of code:

```
class Point{
    private:
        int x, y;
    public:
        Point ( );
        Point ( );
        Point add(Point);
}
void my_function ( ) {
    Point a, b, c, d, e;
    . . .
```

```
    Point f = a.add(foo( ) ? b: c.add(d.add(e)));
    . . .
}
```

The assignment to variable "f" will cause a number of temporary instantiations of "Point" to be constructed and destructed. The expanded code might look something like this:

```
//      Call this location "X"
Point temp1;                         //No constructor called here.
if (foo( )) {
    temp1 = b;                       //temp1 copy constructor
} else {
    Point temp2 = d.add(e);          //temp2 copy constructor
    //      Call this location "Y"
    temp1 = c.add(temp2);            //temp1 copy constructor
    //temp2 destructor called
}
Point f = a.add(temp1);
//      temp1 destructor called
```

In this piece of code, if the debugger ever needs to move the program counter from location "Y" back to location "X" (i.e. the call of c.add is popped), the destructor for temp2 will need to be called. This is accomplished by having the debugger call the appropriate destructor code for "temp 1" and "temp2". In addition, if the user attempts to move the program counter from "X" forward to "Y", the user should be notified that some objects will not have been properly constructed (i.e. temp1 and temp2.). Accordingly, an effective Fix and Continue debug routine must have knowledge of and make use of destructors to properly readjust the target program to a meaningful starting point near where the previous error was found.

The next concept that is introduced is the destructor tree concept. At any given location in a piece of C++ code, the C++ compiler knows which objects and in what order they should be destructed. All of the locations that would cause the compiler to destroy the same set of objects in the same order can be thought of as being a destructor state. The compiler can assign each of these destructor states a unique number starting from zero. The destructor states can be arranged into a tree, where each are destroys one object and then transfers control to another destructor state. So traversing this destructor tree from the current destructor state all the way to the root, all constructed objects that need to be destroyed are destroyed in the correct order.

Figures 10A, 10B:
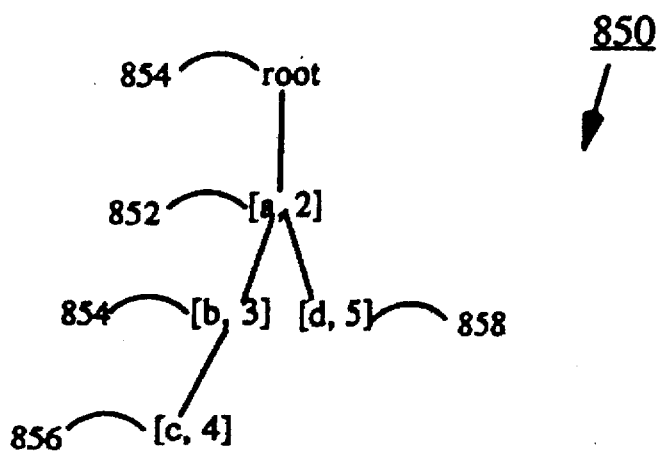
FIGS. 10a & 10b illustrate a constructor/destructor tree and related code set.

Referring to FIG. 10a a sample function which generates constructors and destructors 800 is depicted. Illustrated is a C++ function where A is a C++ class. The left hand column 802 shows the line number and the right hand column 804 shows the destructor state associated with the beginning of each source code line. FIG. 10b depicts the destructor tree 850 corresponding to the function 800. Below the destructor tree root 851 the first node 852 refers to the first destructor relating to object "a" and has a destructor state of "2" which points to all of the locations that would cause the compiler to destroy object "a". A Constructor for object "b" is created after object "a" in the function but before a destructor for object "a" is executed and a constructor for object "c" is created after object "b" in the function but before a destructor for object "a" is executed. Accordingly the deconstructor tree has node 852 representing the destructor for "a" linked to node 854 representing the destructor for object "b" which in turn is linked to node 856 representing the destructor for "c". In the function 800 objects "b" and "c" have already been destroyed by the time object "d" is created so that in the tree 850 node 858 representing the destructor for object "d" is connected directly to node 852 representing the destructor for object "a". Referring now to both FIGS. 10a and 10b it can be seen that if the Program Counter is moved from line 14 808 to line 10 806, the destructor state changes from 4 814 to 2 812 and according to the tree, object "c" with state = to 4 at node 856 and then object "b" with state =3 at node 854 should be destroyed. Similarly, if the Program Counter is reset from line 19 810 to line 10 806 the state at node 858 indicates that object "d" should be destroyed.

If the debugger wishes to move a program counter from one location to another, it can determine the destructor state associated with the old and new Program Counter locations and traverse the arcs in the destructor tree from the old state to the new state. As long as each are traversal is towards the tree root, the correct objects are destructed. Any are traversal away from the tree root, should cause a error/warning message that some object has not been properly constructed.

The debugger needs to have access to the destructor tree in order to be able to relatively safely move the program counter around. This data must be supplied to the debugger by the Compiler. Compilers typically supply such data which relates the corresponding attributes of the source code to the corresponding object code. In the preferred embodiment such data from the compiler is supplied in the form of "Symbol Table Entry data" or "stabs".

Stabs:

Stabs are the accepted way conveying this sort of information. Other schemes such as embedding this info into the text of the program may alternatively be used, but no better solution was found.

The N_SLINE stab must be augmented to contain the destructor state number for the current line. In addition, each destructor state must specify the following:

the destructor state number the address immediately following the constructor, the address of the first instruction of the destructor code the number of bytes of destructor code to execute the destructor state number of the parent destructor state.

How all of this is encoded into stabs is described below. In addition to the need to perform various reinitializations and clean-up on objects, other variables whose state may need to be reinitialized may exist. These are discussed generally under the heading of "Uninitialized variables".

Uninitialized variables:

Both C and C++ have variables. Whenever the Program Counter is advanced across the code that first assigns a value to a variable, the variable becomes uninitialized and any subsequent access to it will get a random value. The desired behavior is that the user be informed whenever the program counter is adjusted forward over a variable initialization. In the presently preferred embodiment the invention ignores this condition. However those skilled in the art will recognize that alternative implementations are possible. The ultimate interface would be to provide a list of the variables that are uninitialized, but a minimally acceptable solution could be to simply warn the user whenever at least one variable is uninitialized. This behavior could be achieved by having the compiler maintain a counter which is incremented whenever a variable is first assigned to. By encoding this counter value into the N_SLINE stab, the debugger could emit a warning message whenever the counter value changes from one line to another.

Encoding information in N SLINE stabs:

The basic strategy for encoding the N_SLINE stabs counters is to use a delta encoding in the 8-bit "other" field of the N_SLINE stab. Delta encoding means using only the difference between the real value for this entry and the real value for the previous entry. The compiler generates these values. For the .stabs and .stabn, assembler pseudo opcodes generated in the Run Time Compiler these are defined as follows:

.stabs "string", type, other, desc, value

.stabn type, other, desc, value

In the preferred embodiment, the encoding of the "other" field is to break it into two 4-bit signed values. In order to compute the counter values, two virtual counters are initialized to zero, and starting from the first N_SLINE stab after the function stab, the two counters are incremented and/or decremented using the 4-bit sign extended values. The low 4-bit field is used for the destructor counter and the high 4-bit field is used for the variable counter. The counter values for a particular stab are taken after the 4-bit values have been added in. Finally, if either of the 4-bit fields are not large enough to contain the delta value, the entire "other" field is set to 255 and the two delta values are encoded as two signed numbers separated by a colon in a stab string. The example below is an illustration of this concept:

| stabs "main:F (0, 4)",0x24,0,0,_main | ! Vars:0 Destructs:0 |
|---|---|
| .stabn 0104,0,15,LL1 | ! Vars:0 Destructs:0 |
| .stabn 0104,1,16,LL2 | ! Vars:0 Destructs:1 |
| .stabn 0104,16,17,LL3 | ! Vars:1 Destructs:1 |
| .stabn 0104,0,18,LL4 | ! Vars:1 Destructs:1 |
| .stabn "−1:−1",0104,255,15,LL5 | ! Vars:0 Destructs:0 |

The new N CONSTRUCT and N DESTRUCT stabs:

Each time an object is constructed that needs to be eventually destructed, two new stabs will be emitted by the compiler. The N_CONSTRUCT stab will be as follows:

.stabs "<variable>:<state>",N_CONSTRUCT, 0, <end>-<start>,<start>-<func> where

<variable> is the object variable name. This is empty if there is no variable name.

<state> is the destructor state number.

<start> is the address of the first instruction of destructor code.

<end> is the address of the instruction following the last instruction of destructor code. Thus, <end>-<start> specifies the number of bytes of destructor code. It is believed that 16-bits is plenty of space to encode this.

<func> is the function name. Thus, <location>-<func> is a function relative offset.

The N_DESTRUCT stab will be as follows:

.stabs "<state>: <parent>" N_DESTRUCT,0, <end>-<stan>,<start>-<func> where

<state> is the destructor state number.

<parent> is the parent destructor state number. 0 is the root of the destructor tree.

<start> is the address of the first instruction of destructor code.

<end> is the address of the instruction following the last instruction of destructor code. Thus, <end>-<start> specifies the number of bytes of destructor code. It is believed that 16-bits is plenty of space to encode this.

<func> is the function name. Thus, <start>-<func> is a function relative offset.

In the preferred embodiment, if the assembler and/or code generator does not accept an expression in second to last argument of an stabs directive, it will have to be fixed to do so.

Floating point register spilling/unspilling:

In C and C++, users can specify that a variable is to be stored in a register via the "register" keyword. The "register" specifier works in both optimized and unoptimized code (i.e. —g.) In addition, the register specifier also works for both integer and floating point registers. The SPARC architecture has the 32 integer registers and 32 floating point registers, where the integer registers are managed via the register window mechanism and the floating point registers are not. Finally, the SPARC ABI is asymmetric in the sense that integer registers are saved/restored by the callee and floating point registers are saved/restored by the caller. In unoptimized code with variables stored in register floating point variables, there will be code to spill and restore the appropriate floating point registers around each routine call.

For example the following code:

```
int main (void)
{
    register float a, b, c, d;
    a = b = c = d = 1.0;
    foo ( );
    return 0;
}
``` will generate the following code around the call to "foo":

```
spilld      %f28, [%sp+LP16]
spilld      %f30, [sp+LP16+0x8]
call        _foo,0
nop
ldd         [%sp+LP16], %f28
ldd         [%sp+LP16+0x8], %f30
```

Note that "spilld" is a pseudo opcode for "std". In addition, note that the "spilld" instruction is saving two floating point registers at a time.

The problem with the register floating point variables is that the "pop" command must properly restore their values before the program counter can be safely moved. The "pop" command will restore the integer registers by forcing a "restore" instruction to occur. The "pop" command must also look at the instructions following the delay slot of the call instruction and execute all %sp relative load instructions.

The N CMDLINE stab:

When it is time to recompile a source file, the debugger will simply exec the contents of the N_CMDLINE stab. The contents of the command line stab are as follows:

stabs "<cwd>; <driver> <options> <prefix_magic>", N_CMDLINE,0,0 where

N_CMDLINE is 0x34

<cwd> is the current working directory as specified by the —cwd option from the driver.

<driver> is the full path to the driver.

<options> is the list of options passed into the compiler. This list is modified so that only the source file being compiled is specified, and it is specified with the —c option to generate a .o file.

<prefix_magic> is the a set of options of the form to pass the current global prefix back into the front-end via the driver. See the example below. Note that care must be taken to ensure that multiple fix-and-continue runs, do not keep duplicating <prefix_magic>.

Any funny characters that would otherwise be interpreted by the /bin/sh need to be quoted with a back-slash. The dollar sign character ($) is one such character.

For example, if a "myfile.cc" was compiled as follows:
CC —I./include —g —o myprog myfile.cc
the resulting command in N_CMDLINE would look as follows:

"<path1>; <path2>/CC —I./include —g myfile.cc —c —Qoption ccfe —prefix —Qoption ccfe <prefix>".

where

<path1> is the absolute path to the working directory where the file was originally compiled;

<path2> is the absolute path to the compiler driver; and

<prefix> is the globalization prefix used in the compilation of this file.

Globalization:

In the preferred embodiment, in order for the functions recompiled by fix-and-continue to be able to access the current values in the executable, all file static variables must be converted into global values. The exception to this rule is nested static variables within a function, which must instead generate a warning message if compiled during a fix cycle. Globalization will be enabled whenever the —g option is enabled in the compile operation.

The first time a file is compiled, the compiler will create a unique prefix and prepend it to each file static variable. The unique symbol will consist of the internet address (or 0), time-of-day, and process id (16-bits only.) The globalization prefix is encoded into the N_OPT stab with the form:

G=<prefix>.

The globalization prefix will be of the form:

.<internet_address><time of day><process_id>.

The 80-bits will be encoded as 14 characters, where each character contains 6-bits of information. The characters a–z, A–Z, 0–9, _, and $ are used to store the 6-bits. The following routine can be used to get the global prefix:

The following code shows how various static variables are globalized:

```
int a;              /* a
static int b;       /* <prefix>.b */
foo (void)
{
    static int e;   /* <prefix>.foo.e*/
    {
        static int f;   /* Warning message if fixing*/
    }
}
```

In the case of C++, the function name in the globalized name should be mangled. The warning message above indicates to the user that the static variable is being reinitialized.

Function padding:

In the preferred embodiment, in order to support fix-and-continue in a debugger system containing the present invention, all functions should be prepended with 4 words of storage. These 4 words are loaded up with a code sequence that branches to the newly loaded code. For a FORTRAN function with N entry points, the pad area will have to be N*4 words. The padding will be emitted by the compiler irrespective of whether —g is specified or not.

There is no need to tell the debugger about the padding via the N_OPT stab since that padding will be implicit in the stabs version number.

If the padding is not present, the debugger will use the first 4 words of the function for code patching, but if a function has fewer than 4 words in them they cannot be fixed by the debugger and a warning message will be raised.

Setting the Program Counter

Figure 8:
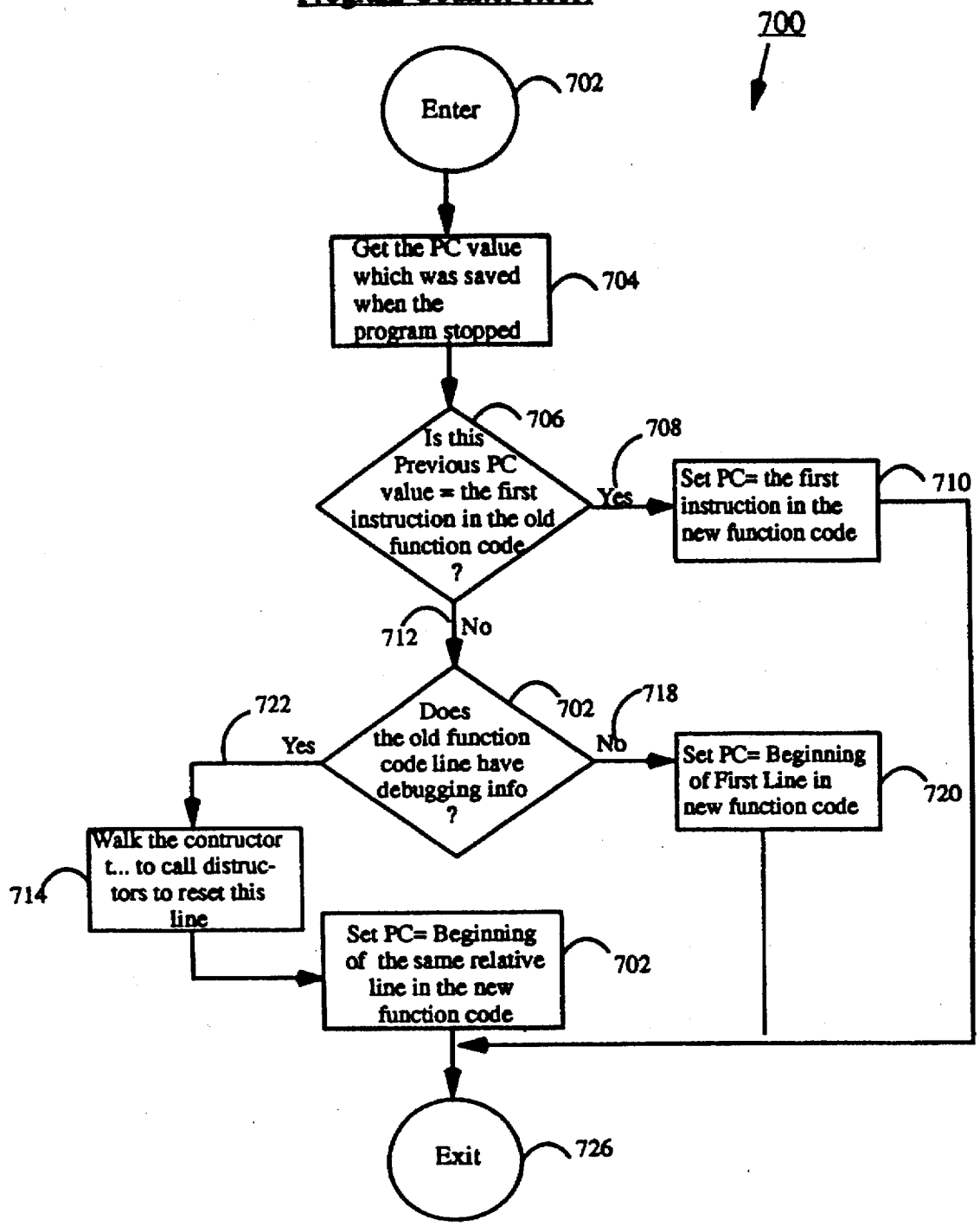
FIG. 8 illustrates a flow chart of the Program Counter Reset methodology of the Fix and Continue system.

Having reviewed the methods used in the preferred embodiment for the Run Time Compiler to convey the necessary information to the debugger concerning constructors & destructors, static variables and register spills, the actions to set the Program Counter can now be described. Referring to FIG. 8 the Program Counter ("PC") Reset program 700 is described. Upon entry to the program 702 the old PC value (which was saved when the application program error occurred which caused the program to stop) is retrieved 704. This old PC value is tested 706 to see if it points to the first instruction in the old function code. If it does 708 then the PC is set to the first instruction in the corresponding new function code 710 and returns 726. If it does not 712 then the old function code is checked to see if it contained debugging information 716. If it does 722 the destructor tree is checked to call any destructors to reset this line 714 and then the PC is set to point to the same relative line in the new function code 724 and returns 726. If it does not 718 the PC is set to point to the beginning of the first line in the new function code 720 and returns 726.

Executing the Pop Command

Figure 9:
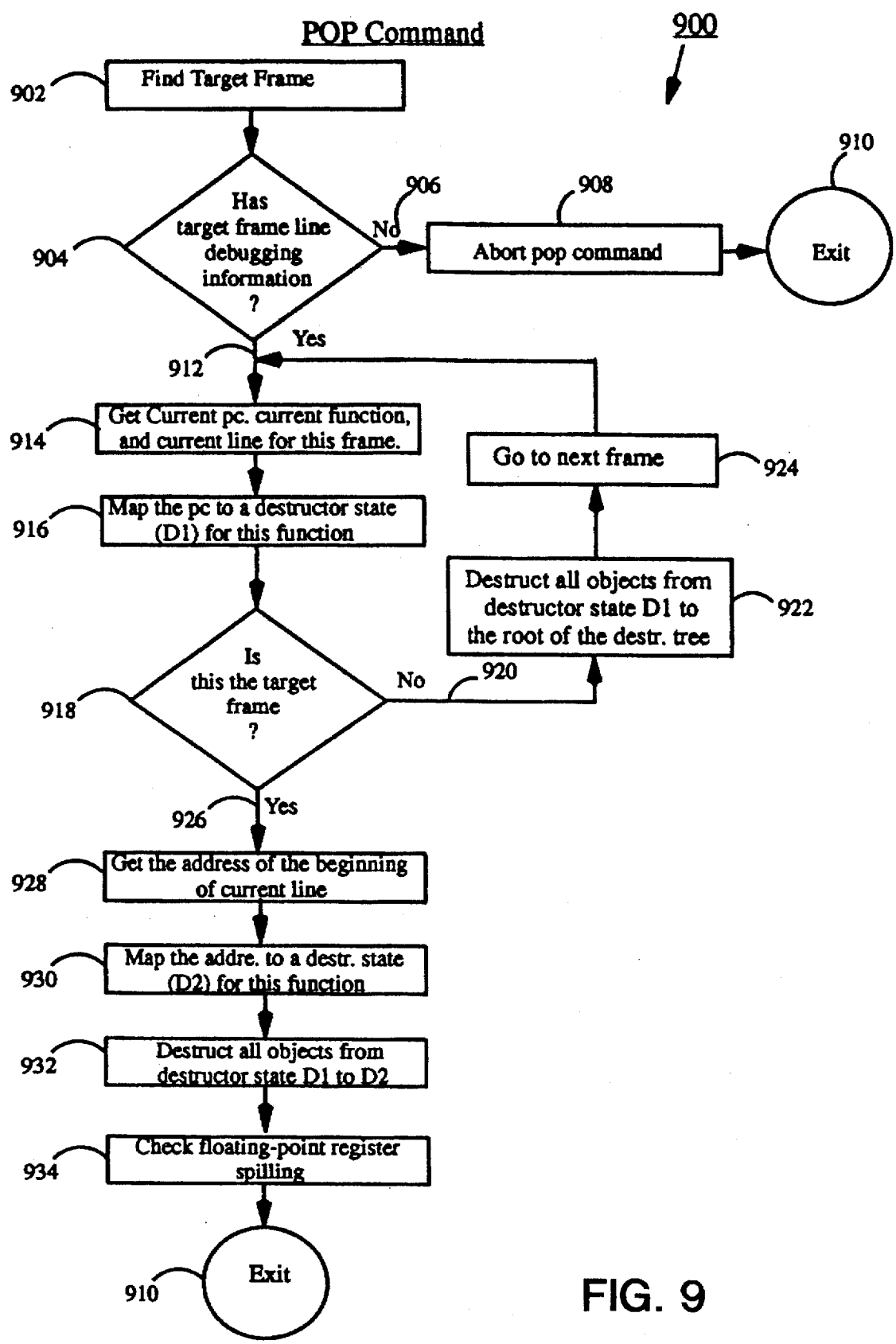
FIG. 9 illustrates a flow chart of the operation of the Pop command.

As indicated above (see 512, 514 and 516 in FIG. 6) the Fix command routine will exit with an error message if it detects a change in any local variables in a function on the stack. This error message recommends to the user that he execute a "POP" command to "Pop" the function containing the changed local variable off the stack. The "POP" program 900 is now described with reference to FIG. 9.

Upon entry, the "POP" routine finds the target frame 902, and checks to see if the target routine has frame line debugging information 904. If not 906 the "POP" routine is aborted 908 returns 910. If it does 912, the routine gets the current PC, current function and current line for this frame 914. The PC is mapped to a destructor state for this function 916 and the frame is tested to see if this one is the target frame 918. If not 920 the routine destructs an objects from the destructor state found in step 916 to the root of the destructor tree 922 and proceeds to the next frame 924 returning to step 914 to execute the process just described for the next frame. If in step 918 the frame was determined to be the target frame 926 the routine gets the address of the beginning of the current line 928, maps the address to a destructor state for this function 930, destructs all objects from the destructor state obtained in step 930 to the destructor state obtained in step 916. The routine then checks for any floating point register spilling 934, makes any required resets and returns 910. In this discussion "start frame" is the stack frame where the program is stopped. Target frame is the stack frame from which we wish to pop the stack and this target frame can be the second frame in the stack or it can be several frames down in the stack.

Code Patching

Also as indicated above (see 522 in FIG. 6), the old code is patched to the newly compiled code. This process patching process 600 is now described with reference to FIG. 7. The original version of object code for a target application program is show 602 containing function 1 608, function 2 610 and function 3 612. also shown is object code for version 1 of the program 604 which resulted from the first Fix (ie. edit, recompile and relink). This version 1 code set contains function 4 628 which was not in the original version 602. Also shown is code for version "n" (where "n" can be any number only limited by available memory) 606 wherein function 3 612 has been deleted. This illustrates that the code patching scheme is flexible enough to allow a particular Fix cycle to add new functions or delete old functions if necessary. In patching an old version to a newer version the entry location of each function is patched to point to the entry location of the new function. For example, in FIG. 7 the entry location of function 1 in the original version 618 is patched to point 620 to the entry location of function 1 in the next version of the code 622. Similarly, this entry location of version 1 of the code 622 will be patched to point 624 to the next version of the code, assuming that the next version does not delete function 1, in which case entry location of version 1 of the code 622 will not be patched.

Those skilled in the art will recognize that any patching scheme for relating various code versions to the prior version may be used in such an application. In the presently preferred embodiment the following process is used. Each function in the original file is patched with a sequence of instructions that call the fixed function in the newly compiled code. The pad area provided by the compiler is used if available. The patch instructions on SPARC ( the sequence of instructions is architecture specific) looks like this:

| For a function "foo" (not patched) the first few instructions look like | | |
|---|---|---|
| | foo–0x10: nop | |
| | foo–c: nop | |
| | foo–8: nop | |
| | foo–4: nop | |
| | foo: nop | |
| Entry => | foo: sethi | %hi (0xffffffc00), %g1 |
| | foo+4: add | %g1, 920, %g1 |
| | foo+8: save | %sp, %g1, %sp |
| | ... | |

Executing the Fix on this function will patch a "jmp" at the function entry and patch 3 instructions in the pad area with a call to the newly compiled function "foo"

| | foo–0x10: save | %sp,–96,%sp |
|---|---|---|
| | foo–c: call | foo' |
| | foo–8: restore | |
| | foo–4: nop | |
| Entry => | foo: ba,a .–0x10 | |
| | foo+4: add | %g1, 920, %g1 |
| | foo+8: save | %sp, %g1, %sp |
| | ... | |

If the pad area is not available, the first 4 instructions of the function will be used.

Fix and Continue Re-compile Attributes

It should be noted that the re-compilation commands which may be issued by the Fix and Continue invention of the preferred embodiment can be used to add debug information to the recompiled code that originally had no debug information or otherwise modify the line of code being re-compiled. this is done by using the Fix and Continue portion of the debugger to set appropriate flags at the user's discretion.

Fix and Continue

The above descriptions disclose the steps necessary to make and use the present Fix and Continue invention in the preferred embodiment. Those skilled in these arts will recognize that alternate implementations of the various flags and stabs, alternate code systems, compilers, linkers and various display systems and processor platforms may be used to produce and perform the same invention. Accordingly, while certain exemplary embodiments have been described in detail and shown in the accompanying drawings it is to be understood that such embodiments are merely illustrative of and not restrictive on the broad invention, and that this invention not be limited to the specific arrangements and constructions shown and described, since various other modifications may occur to those ordinarily skilled in the art.

APPENDIX A fix *and* continue 

This chapter is organized into the following sections:

| | |
|---|---|
| Basic Concepts | page 20-245 |
| How fix and continue Operates | page 20-246 |
| Source Modification Using fix and continue | page 20-246 |
| Precautions | page 20-247 |
| Example | page 20-248 |
| Command Summary | page 20-250 |

20.1 Basic Concepts

The fix and continue feature of the Debugger allows you to modify a source file, and without leaving the Debugger, recompile the file and continue execution of the program. The advantages of using fix and continue are

- You do not have to relink the program.
- You do not have to reload the program into the Debugger.
- You can resume running the program from the fix location.

Note – This feature is not supported by the Pascal compiler.

20-245

P664. Preisler et al          ejb 08/29/94

20

20.2 How fix and continue *Operates*

Before applying the fix command you need to edit the source. You can modify the source file either by enabling editing in the source display or by editing the file in your system editor. See Chapter 14, "Editing a Program" for an explanation of how to edit in the source display.

After you save your changes to the source, select Fix from the Execution menu. Once fix has been invoked, the Debugger calls the Compiler with the appropriate compiler options. The modified files are compiled and shared object (.so) files are created. Semantic tests are done by comparing the old and new files (the old file is the file before the latest edits were made; the new file is the file containing the latest edits).

The new object file is linked to your running process using the runtime linker. The program counter is moved from the old function to the beginning of the same line in the new function (if the function is on top of the stack being fixed). All the breakpoints in the old file are moved to the new file. The modified source is then displayed in the source display and you can resume debugging from the exact point in the source that you stopped at.

You can use fix and continue on files that have been compiled with or without debugging information, but there are some limitations in the functionality of fix and continue for files originally compiled *without* debugging information. See the -g option description in Section 20.6, "Command Summary," on page 20-250, for more information.

(Solaris 2.x) You can fix shared objects (.so) files, but they have to be opened in a special mode. You can use either RTLD_NOW|RTLD_GLOBAL or RTLD_LAZY|RTLD_GLOBAL in the call to dlopen. This procedure works only for Solaris 2.x.

20.3 *Source Modification Using* fix *and* continue

You can modify sources in the following ways when using fix and continue:

- Add, delete, or change lines of code in functions.
- Add or delete functions.
- Add or delete global and static variables.

20 ≡

Restrictions

The Debugger might have problems when functions are mapped from the old file to the new file. To minimize such problems when editing a source file, you should be careful not to:

* Change the name of a function.
* Add, delete, or change the type of arguments to a function.
* Add, delete, or change the type of local variables in functions currently active on the stack (see the pop command for more information).
* Only the body of a C++ template function definition can be modified. Any changes to the declaration of a template or to template instances requires a complete remake of the program.

20.4 Precautions

Resuming program execution after performing a fix and continue can cause errors that may not be directly related to the actual modifications to the source. Before resuming program execution after you have modified the source, you should be aware of the following conditions:

* If a function being modified is already instantiated on the stack (not the top frame), the program executes the old code (that is, the unmodified code) when returning to that frame.
* Changes made to global variables are not undone by the pop or fix command. Use the assign command to manually reassign correct values to global variables.
* Values of static variables are normally retained across fixes. However, if the file was not originally compiled with debugging information, static variables in that file are reinitialized after each fix. You can use the assign command to manually reassign correct values to static variables.

A special case is shown in this example code segment:

```
extern   int            x;
...
...
static   int            x;
```

In this case, static variable x is reinitialized after each fix. You can use the `assign` command to manually reassign correct values to the variable.

- Breakpoints in already instantiated functions on the stack in the old code are lost.

- Breakpoints are moved (not copied) from old files to new files. Therefore, if the number of lines of source code were changed due to your edits, the placement of the breakpoints might be incorrect. The Debugger displays a warning message telling you that the breakpoints have moved to new lines. You should check the locations of the breakpoints with the `status` command in the new code before running the program.

- The program counter is moved to the beginning of the same line in the new (fixed) function. If the function has been modified, the program counter can end up at a wrong line. In that case, do one of the following:
  - Use the `pop` command. It pops one (or more) frames from the stack and a `continue` re-enters the function.
  - Use the `cont at <linenum>` command to continue from another line (effectively moving the pc before executing).
  - Manually repair data structures (use the `assign` command) before continuing.
  - Rerun the program.

(Solaris 1.x)
- New global functions and variables can only be referenced from within the same module in which they are defined.

20.5 Example

The following example shows how a simple bug can be fixed with `fix` and `continue`. The application will get a segmentation violation in line 6 when trying to dereference a NULL pointer:

```
dbx[1] list 1,$
    1   #include <stdio.h>
    2
    3   char *from = "ships";
    4   void copy(char *to)
    5   {
    6       while ((*to++ = *from++) != '\0');
    7       *to = '\0';
    8   }
    9
```

```
10   main()
11   {
12        char buf[100];
13
14        copy(0);
15        printf("%s\n", buf);
16        return 0;
17   }
(debugger) run
Running: testfix
(process id 4842)
signal SEGV (no mapping at the fault address) in copy at line 6 in
    file "testfix.cc"
     6       while ((*to++ = *from++) != '\0');
```

Change line 14 to copy to buf instead of 0 and save the file, then do a fix:

```
14        copy(buf);    <=== modified line
(debugger) fix
fixing "testfix.cc" .....
pc moved to "testfix.cc":6
stopped in copy at line 6 in file "testfix.cc"
     6       while ((*to++ = *from++) != '\0');
```

If the program is continued from here, it still gets a SEGV because the zero-pointer is still pushed on the stack. Use the pop command to pop one frame of the stack:

```
(debugger) pop
stopped in main at line 14 in file "testfix.cc"
    14        copy(buf);
```

If the program is continued from here, it will run, but it will not print the correct value because the global variable from has already been incremented by one. The program would print hips and not ships. Use the assign command to restore the global variable and then continue. Now the program prints the correct string:

```
(debugger) assign from = from-1
(debugger) cont
ships
```

*fix and continue*

≡ 20

20.6 Command Summary

The fix command takes the following options:

fix [*options*] [*file1, file2, ...*]

where

-a fixes all modified files. This is the default option in the Debugger.

-f tells the Debugger to force fixing the file, even if the source was not changed.

-c tells the Debugger to print the compilation line (which may include some options added internally for use by dbx).

-g strips -O flags from the compilation line and adds the -g flag to it.

-n sets a no execution mode in the Debugger. Use this option when you want to list the source files to be fixed without actually fixing them.

*file1, file2,...* specifies a list of modified source files to fix.

If fix is invoked with an option other than -a and without a filename argument, only the current modified source file is fixed.

Note – Sometimes it may be necessary to modify a header (.h) file as well as a source file. To be sure that the modified header file is accessed by all source files in the program that include it, you must give as an argument to the fix command a list of all the source files that include that header file.

If you do not include the list of source files, only the primary source file is recompiled and only it includes the modified version of the header file. Other source files in the program continue to include the original version of that header file.

Note – C++ template definitions cannot be fixed directly. Fix the files with the template instances instead. You can use the -f option to overwrite the date-checking if the template definition file has not changed. dbx looks for template definition .o files in the default repository directory "Templates.DB". The -ptr compiler switch is not supported by dbx.

20

When fix is invoked, the Debugger looks for the current working directory of the file that was current at the time of compilation before executing the compilation line. The Debugger might have problems locating the correct directory due to a change in the file system structure from compilation time to debugging time. To avoid this problem, use the command pathmap, which creates a mapping from one pathname to another. Mapping is applied to source paths and object file paths. For detailed information on pathmap, see Section 3.2.2, "Setting the Search Path with pathmap," on page 3-37, type help pathmap in the command pane, or see the dbx man pages.

What is claimed is:

1. A method for debugging a computer application program on a computer system which includes a processor, a program counter, memory and program instructions, the method being designed to allow generation and insertion of corrective program instructions while continuing a debugging session, the method being implemented by said program instructions and comprising the steps of:

detecting an error in said computer application program, which is executing during a debugging session, in said computer system's memory;

dynamically fixing program code which contains said error without terminating said debugging session; and continuing the debugging session with said fixed program code by continuing said debugging session where said error occurred, whereby the program error was corrected without stopping the debugging session in order to recompile an entire program.

2. The method for debugging a computer application program of claim 1 wherein said step of fixing program code which contains said error without terminating said debugging session comprises the additional steps of:

calling a compiler and passing to the compiler a file of edited source code containing edits to correct said error;

receiving from the compiler a recompiled object code file corresponding to said file of edited source code;

creating a dynamic library file corresponding to said recompiled object code file;

linking said dynamic library file to said computer application program;

dynamically patching the computer application program to point to said dynamic library file;

resetting the program counter; and moving break points to said recompiled object code file.

3. The method for debugging a computer application program of claim 2 wherein said step of resetting the program counter comprises the additional step of resetting the program counter to a location corresponding to a beginning of a same line in the recompiled object code file which corresponds to a specific line in the corresponding previous version of the object code wherein the error occurred in executing said specific line, if a function containing said same line was not modified in said recompiled object code file.

4. The method for debugging a computer application program of claim 2 wherein said compiler is configured to globalize static variables in said file of edited source code containing edits to correct said error, to provide data relating to constructors and destructors in said file of edited source code containing edits to correct said error and to provide data relating to floating point register settings in said file of edited source code containing edits to correct said error.

5. A method for debugging a computer application program on a computer system which includes a processor, a program counter, memory and program instructions, the method being designed to allow generation and insertion of corrective program instructions while continuing a debugging session, the method being implemented by said program instructions and comprising the steps of:

loading a debugger computer program into said memory;

loading source code and object code for a compiled computer application program into said memory;

requesting said debugger computer program to begin a run-me execution of said compiled computer application program object code;

executing a fix and continue routine in said debugger computer program if an error is found, wherein a source code file containing said error is edited, recompiled and recompiled object code for said source code file containing said error is dynamically patched into previously loaded object code of said compiled computer application program; and said debugger restarting said run-time execution of said compiled computer application program object code which has been edited wherein said restart occurs in an area of said recompiled object code where said error was detected, whereby the program error was corrected without stopping the debugging session in order to recompile an entire program.

6. The method for debugging a computer application program of claim 5 wherein said object code for a compiled computer application program is generated using an enhanced compiler whereby object code produced by the compiler contains debugging aids.

7. The method for debugging a computer application program of claim 6 wherein said debugging aids comprises globalization of static variables.

8. The method for debugging a computer application program of claim 7 wherein said debugging aids further comprises data to permit restoration of floating point registers.

9. The method for debugging a computer application program of claim 7 wherein said debugging aids further comprises data to permit execution of constructor and destructor commands as required to restore variable contents to correct values upon restarting run-time debugging.

10. The method for debugging a computer application program of claim 5 wherein said step of executing a fix and continue routine in said debugger computer program if an error is found comprises the additional steps of:

calling a compiler and passing to the compiler a file of edited source code containing edits to correct said error;

receiving from the compiler a re, compiled object code file corresponding to said file of edited source code;

linking said recompiled object code file to a corresponding previous version of said object code file;

resetting the program counter;

moving break points to said recompiled object code file; and restarting said application program at the point indicated by the program counter wherein the debugging process continues.

11. The method for debugging a computer application program of claim 10 wherein said step of linking said recompiled object code file to a corresponding previous version of said object code file comprises the additional step of patching an entry location of a function code section in said previous version of said object code file to point to a corresponding entry location of a corresponding function code section in said recompiled object code file.

12. The method for debugging a computer application program of claim 10 wherein said step of resetting the program counter comprises the additional steps of:

resetting the program counter to a location corresponding to a beginning of a same line in the recompiled object code file which corresponds to a specific line in the previous version of the object code wherein the error occurred in executing said specific line, if a function containing said same line was not modified in said recompiled object code file; and popping one or more frames from a stack containing data corresponding to said function containing said same line and setting the program counter to a location of a statement that called said function, if said function containing said same line was modified in said recompiled object code file.

13. A computer system for debugging a computer application program, the system being designed to allow generation and insertion of corrective program instructions dynamically into the computer application program while continuing a debugging session, the computer system comprising:

a processor having a program counter, memory and program instructions;

a debugger in said memory configured to detect an error in said computer application program during a debugging session, said debugging session executed by said processor; and said debugger comprising:
- a fix subsystem for dynamically repairing program code which contains said error without terminating said debugging session; and
- a continue subsystem for restarting said debugging session where said error occurred using said repaired program code, whereby the program error was corrected without stopping the debugging session in order to recompile an entire program.

14. The computer system for debugging a computer application program of claim 13 wherein said fix subsystem comprises:

a call mechanism configured to invoke a compiler and to pass to the compiler a file of edited source code containing edits to correct said error;

a communications mechanism configured to receive from the compiler a recompiled object code file corresponding to said file of edited source code;

a linking mechanism which can connect said recompiled object code file to a corresponding previous version of said object code file;

a program counter control mechanism which can modify said program counter; and a break point placement mechanism which can move brake points from a previous object code File to said re, compiled object code file.

15. The computer system for debugging a computer application program of claim 14 wherein said program counter control mechanism comprises:

a first control device which can set the program counter to a location corresponding to a beginning of a same line in the re, compiled object code file which corresponds to a specific line in the corresponding previous version of the object code wherein the error occurred in executing said specific line, if a function containing said same line was not modified in said recompiled object code file; and a second control device which can pop one or more frames from a stack containing data corresponding to said function containing said same line and thereafter set the program counter to a location of a statement that called said function, if said function containing said same line was modified in said recompiled object code file.

16. The computer system for debugging a computer application program of claim 14 wherein said compiler is configured to globalize static variables in said fie of edited source code containing edits to correct said error, to provide data relating to constructors and destructors in said file of edited source code containing edits to correct said error and to provide data relating to floating point register settings in said file of edited source code containing edits to correct said error.

17. The method for debugging a computer application program of claim 1 wherein said step of fixing program code which contains said error without terminating said debugging session comprises the additional step of popping one or more frames from a stack containing data corresponding to said function containing said same line and setting the program counter to a location of a statement that called said function, if said function containing said same line was modified in said recompiled object code file.

18. A system for debugging a computer application program on a computer which includes a processor, a program counter, memory and program instructions, the system being designed to allow generation and insertion of corrective program instructions dynamically into the computer application program while continuing a debugging session, the system comprising:

means for detecting an error in said computer application program during a debugging session;

means for dynamically fixing program code which contains said error without terminating said debugging session; and means for continuing the debugging session with said fixed program code by restarting said debugging session where said error occurred, whereby the program error was corrected without stopping the debugging session in order to recompile an entire program.

19. A method for debugging a computer application program on a computer system which includes a processor, a program counter, memory and program instructions, the method being designed to allow generation and insertion of corrective program instructions dynamically into the computer application program while continuing a debugging session, the method being implemented by said program instructions in said memory and comprising the steps of:

detecting an error in said computer application program during a debugging session;

dynamically fining program code which contains said error without terminating said debugging session, said fixing operation permitting a user to specify that debug information should be added and permitting said user to modify a line of code to be fixed; and continuing the debugging session with said fixed program code by restarting said debugging session where said error occurred, whereby the program error was corrected without stopping the debugging session in order to recompile an entire program.

20. A computer program embodied on a computer-readable medium for enabling a system for debugging a computer application program, the system being designed to allow generation and insertion of corrective program instructions dynamically into the computer application program while continuing a debugging session, comprising:

a processor having a program counter, memory and program instructions;

a debugger in said memory configured to detect an error in said computer application program during a debugging session, said debugging session executed by said processor; and said debugger comprising:

a fix subsystem which will allow a user to repair program code which contains said error without terminating said debugging session, said fix subsystem configured to permit said user to specify that debug information should be added and to permit said user to modify a line of code to be fixed; and a continue subsystem which will allow the user to restart said debugging session where said error occurred using said repaired program code, whereby the program error was corrected without stopping the debugging session in order to recompile an entire program.

* * * * *